US012173887B1

(12) United States Patent
St. Ives

(10) Patent No.: US 12,173,887 B1
(45) Date of Patent: Dec. 24, 2024

(54) LIGHTING FIXTURE

(71) Applicant: Laurence Robert St. Ives, Las Vegas, NV (US)

(72) Inventor: Laurence Robert St. Ives, Las Vegas, NV (US)

(73) Assignee: Organic Lighting Systems, INC., Riverside, CA (US)

( * ) Notice: Subject to any disclaimer, the term of this patent is extended or adjusted under 35 U.S.C. 154(b) by 0 days.

(21) Appl. No.: 18/382,929

(22) Filed: Oct. 23, 2023

(51) Int. Cl.
*F21V 33/00* (2006.01)
*E04F 11/18* (2006.01)
*F21S 4/28* (2016.01)

(52) U.S. Cl.
CPC ........ *F21V 33/006* (2013.01); *E04F 11/1817* (2013.01); *F21S 4/28* (2016.01); *E04F 2011/1821* (2013.01); *E04F 2011/1872* (2013.01)

(58) Field of Classification Search
CPC ........ F21V 33/006; F21S 4/28; E04F 11/1817
See application file for complete search history.

(56) References Cited

U.S. PATENT DOCUMENTS

| | | | | |
|---|---|---|---|---|
| 4,161,769 A * | 7/1979 | Elliott | E04F 11/1836 | 362/152 |
| 5,099,402 A * | 3/1992 | Starniri | E04F 11/18 | 362/276 |
| 6,866,125 B2 * | 3/2005 | Ball | B66B 23/24 | 187/391 |
| 8,388,214 B1 * | 3/2013 | Toro | F21V 3/062 | 362/147 |
| 2001/0028227 A1 * | 10/2001 | Lys | G09G 3/32 | 315/368.23 |
| 2008/0080173 A1 * | 4/2008 | Trimble | E04F 11/18 | 362/146 |
| 2010/0315023 A1 * | 12/2010 | Pesson | H05B 47/115 | 362/145 |
| 2013/0058074 A1 * | 3/2013 | Somei | F21V 33/006 | 362/145 |
| 2013/0182428 A1 * | 7/2013 | Seehof | F21V 21/14 | 362/220 |
| 2013/0201665 A1 * | 8/2013 | Roos | F21V 33/006 | 362/145 |
| 2022/0010955 A1 * | 1/2022 | Katou | F21V 9/30 | |

* cited by examiner

*Primary Examiner* — Bryon T Gyllstrom
(74) *Attorney, Agent, or Firm* — David B. Abel

(57) ABSTRACT

A lighting fixture adapted for installation in a handrail having an extruded durable light fixture design and assembly that will allow handrail lighting features for stairways, pathways and architectural features providing a simplified lighting installation and replacement structure. The design enables installation and replacement of very long runs of linear lighting elements that can be installed or removed from handrail at a single end of an installed handrail.

14 Claims, 3 Drawing Sheets

LIGHTING FIXTURE

BACKGROUND AND PRIOR ART

Handrail lighting systems provide a number of desirable benefits and enhancements to building designs and architectural features. Handrail linear lighting is used to create unobtrusive, safety or decorative illumination. Placing the lighting inside the handrails reduces the need for separate lighting fixtures on walls or pathways to meet regulatory pedestrian safety standards. The development of miniature flexible LED arrays provides an opportunity to enhance a lighted handrail. The flexible LED arrays are encapsulated in a polymer material such as PVC or silicone to protect components against water or accidental damage when handling and usually mounted pressed into channels between posts or wall supports for the handrail in continuous linear runs. The flexible LED arrays may be retained in the channels between posts or wall brackets by lenses to inhibit accidental removal or vandalism. However, the pressure required to insert the Flexible LEDs by pressing them into a channel is cumbersome and time consuming and can cause damage to the miniature electronic circuits and LEDs inside the PVC encapsulated strips.

Within the existing handrail designs having linear LED arrays installed between posts or wall brackets, there is a high cost associated with removal and replacement of the LED arrays that may require electricians or building contractors to dismantle the entire handrail assembly and replace the LED array section by section. Accordingly, there exists a need for an in-rail lighting fixture having a simple yet variable design which would allow the LED array to be installed and replaced easily, with less associated expense, and which could be carried out by general maintenance staff.

BRIEF DESCRIPTION OF THE INVENTION

The present invention is directed to handrails or guardrails incorporating a channel for receiving and supporting a lighting fixture including a light emitting diode array and associated mounting assemblies. A handrail is a railing used for support on stairs, a ramp, or other inclined platforms that require some level of navigation. Handrails run on the incline up and down of a set of stairs or ramp. They are intended to provide support for pedestrians to grasp with their hands and used for guidance and support to navigate up or down. By comparison, guardrails generally run horizontally along a raised or elevated platform or other flat areas with a drop off on at least one of the sides. A guardrail is designed to prevent falling from considerable heights and is considered a life-saving device and are designed specifically for safety. Guardrails can also be installed on elevated walkways, stairs, and stair landings for additional safety. For purposes of the following description and claims, the term handrail will be used as generic for both handrails and guardrails. Pursuant to conventional building code standards, handrails must have a diameter of 1.25" to 2".

The present invention contemplates a channel for containing a light emitting diode array configured to fit inside a cavity in a handrail and facilitate simpler slide in insertion or replacement of a linear light emitting diode (LED) array lighting strip into the entire length of the handrail. The channels can be formed in segments four to twenty feet in length. The channels are designed to be inter-connectable enabling the assembly of a continuous channel over fifty feet or even over one hundred feet in length into which a flexible LED array may be installed or replaced from a single point of connection or insertion. The assembly retains the flexible LED array without the need for a lens or secondary cover, reducing labor and speeding up the installation time. Furthermore, installation and future replacement can be achieved without removing the handrails from the anchoring posts or wall brackets.

The present invention optimizes the advantages of light emitting diode (LED) arrays for lighting architectural products. LED arrays can provide colored or color changing effects within the handrail. Recent developments of long flexible LED strips with miniaturized electronics using standard line voltages, which can be run continuously in lengths as long as 300 feet, enable new fixture designs to be created which utilize this simpler method. Metal handrails may require high temperature welding during installation which could damage LED components. The present invention allows for the welding operations to be completed before the installation of the flexible LED array. The slide in light fixture designs of the present invention allows for the mechanical installation of the handrail, channels, brackets and post components on location prior to the installation of the LED arrays and associated electronic components which may be damaged during the installation of the handrails. After the mechanical installation of the handrail components has been completed, the lighting LED arrays and associated electrical components can be installed by insertion through one end of the handrail.

DETAILED DESCRIPTION OF THE INVENTION

Embodiments of the present invention are described below with reference to the appended figures. Upon review of the description and the figures it may be appreciated that alternative cross sectional designs of the channel configurations depicted and described herein may be possible. However, the following description and the figures are intended as being descriptive of the concept and presently known best mode of the configuration of the channel for purposes of describing the invention to those skilled in the art, without limiting the full scope of the invention as defined in the claims.

Figure 1:
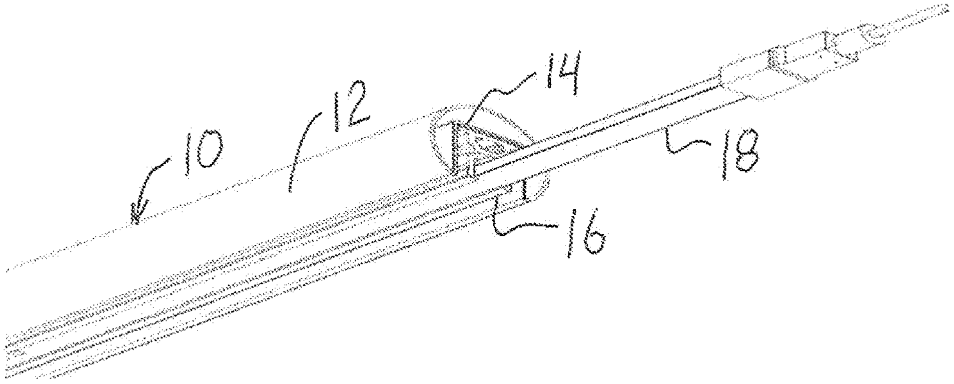
FIG. 1 is a perspective view of a first embodiment of the channel in a handrail illustrating the insertion or removal of the LED array lighting element of the present invention.

FIG. 1 is a perspective view of a first embodiment of a handrail 10 including a handrail body 12 defining a cavity 14. The cavity 14 is sized to accept installation of a channel 16 enclosing a light emitting diode ("LED") array 18. The channel 16 may be force fit into the cavity 14, or alternatively secured with an adhesive, double sided tape or screws. FIG. 1 also illustrates the insertion of the light emitting diode ("LED") array 18, which is preferably a flexible lighting element, into one end 20 of the channel 16 mounted within the handrail body 12.

The handrail body 12 may be formed from wood, a lightweight, strong preferably non-ferrous metal such as aluminum or stainless steel, a plastic, or a composite material. The handrail body 12 may be solid whereby the emitted light is projected downward onto a pathway or stairs. Alternatively, the handrail body 12 and at least portions of the channel 16 may be translucent or partially translucent to allow the installed flexible lighting to illuminate the entire handrail body 12. As another alternative, the handrail body 12 may include spaced apart apertures illuminated by the installed flexible lighting.

Figure 2:
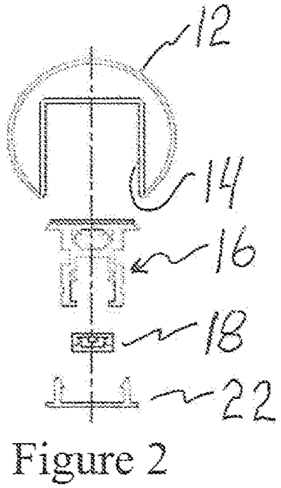
FIG. 2 is an exploded end view of the first embodiment of the channel assembly and handrail of the present invention.
Figure 3:
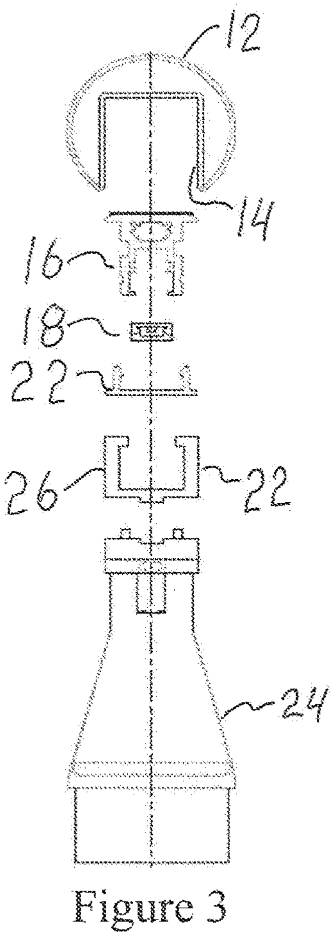
FIG. 3 is an exploded perspective view of a second embodiment of the channel and handrail and an anchoring post of the present invention.

FIG. 2 is an exploded end view of an embodiment of a channel 16, LED array 18 and cover 20 to be installed within the cavity 14 of a handrail body 12 of the present invention. FIG. 3 is an exploded end view of the embodiment of the channel 16, LED array 18 and cover 22, to be installed within the cavity 14 of the handrail body 12 and also depicting an anchoring post 24 and post connector 26 to secure the anchoring post 24 to the channel 16. The post connector 26 is configured to slide around the channel 16 from one end thereof, to be positioned as required to attach to an anchoring post 24 during installation. The components depicted in FIGS. 2 and 3 are preferably assembled at the construction site, whereby the construction of the handrail 10 without an LED array is completed and then the LED array 18 is inserted into one end 20 of the handrail 10, as depicted in FIG. 1, and subsequently electrically connected to a power supply (not shown). This construction also facilitates repair or replacement of the LED array 18, as it can be withdrawn from the end 20 of the handrail 10, repaired or replaced, and then reinserted into the handrail 10 without removing the handrail 10 from the anchoring posts 24.

Figure 4:
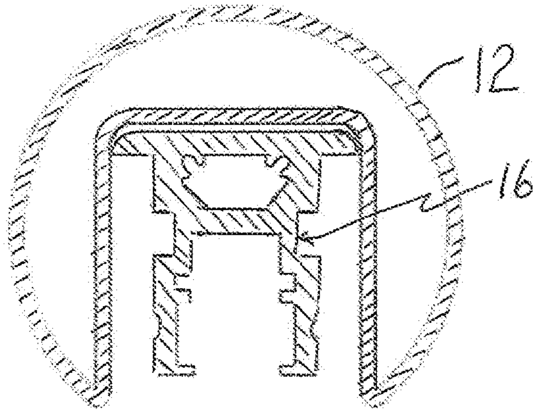
FIG. 4 is a first end view of a large embodiment of the channel installed within a handrail of the present invention depicting the channel for receiving a LED array.
Figure 5:
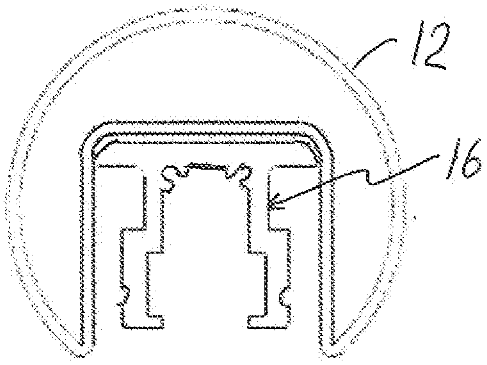
FIG. 5 is a second end view of a small embodiment of the channel of a handrail lighting assembly of the present invention.

As noted above, the standard sizes of handrails are in the range of 1.25 inches to 2 inches in diameter. FIG. 4 is a first end view of a large embodiment of the channel 16 installed within a large diameter handrail body 12 of the present invention without the LED array installed. In this embodiment, the width of the cavity 14 on the underside of the handrail body 12, and the maximum width of the channel 16, is preferably 0.73 inches to 1.8 inches. FIG. 5 is a second end view of a small embodiment of the channel 16 installed within a small diameter handrail body 12 of the present invention without the LED array installed. In this embodiment, the width of the cavity 14 on the underside of the handrail body 12, and the maximum width of the channel 16, is preferably 0.6 inches to 1.0 inches. It should thus be appreciated that the largest width of the cavity 14, as well as the width of the channel 16, will preferably be in the range of 0.6 inches up to 1.8 inches, depending on the respective major diameter of the handrail body 12.

Figure 6:
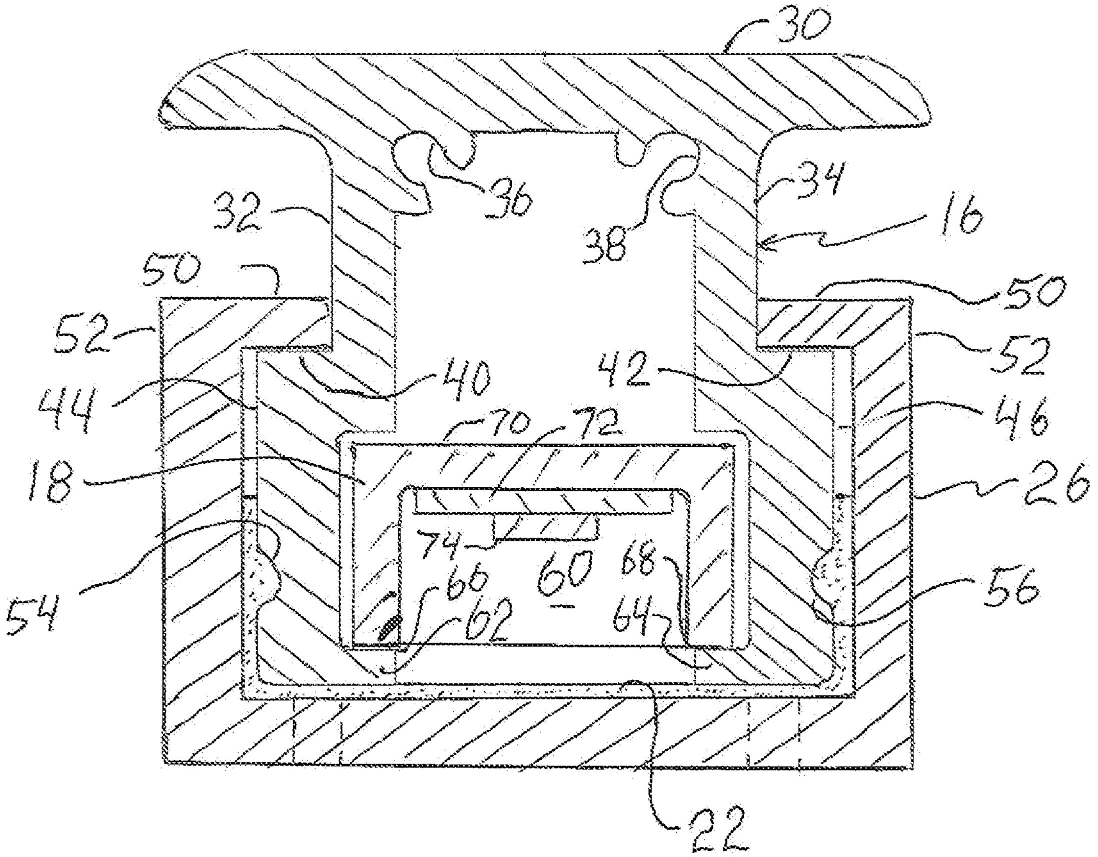
FIG. 6 is an end cross-section view of the small embodiment of the channel of FIG. 5 of the present invention showing the post or wall bracket connector gripping the channel so as to slide to any desired position along the channel.
Figure 7:
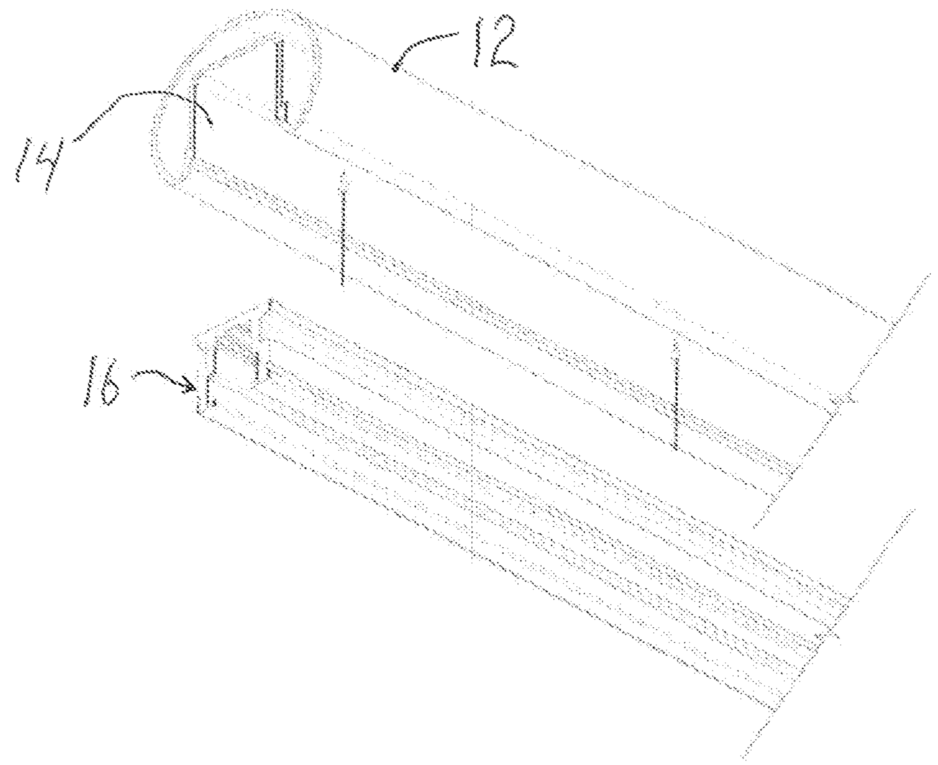
FIG. 7 is a perspective view of the channel exploded from the handrail body of the present invention.

FIG. 6 is an enlarged end cross-section view of the channel 16 of FIG. 5, depicting the LED array 18 installed within the channel 16 as well as the post connector 26 surrounding a portion of the channel 16. The post connector 26 is installed over an end of the channel 16 and then slide along the channel to the preferred location to attach to a post 24. FIG. 7 is a perspective view of the channel 16 exploded from the handrail body 12 and FIG. 8 is a perspective view of an assembled segment of a handrail 10, without the LED array installed.

Figure 8:
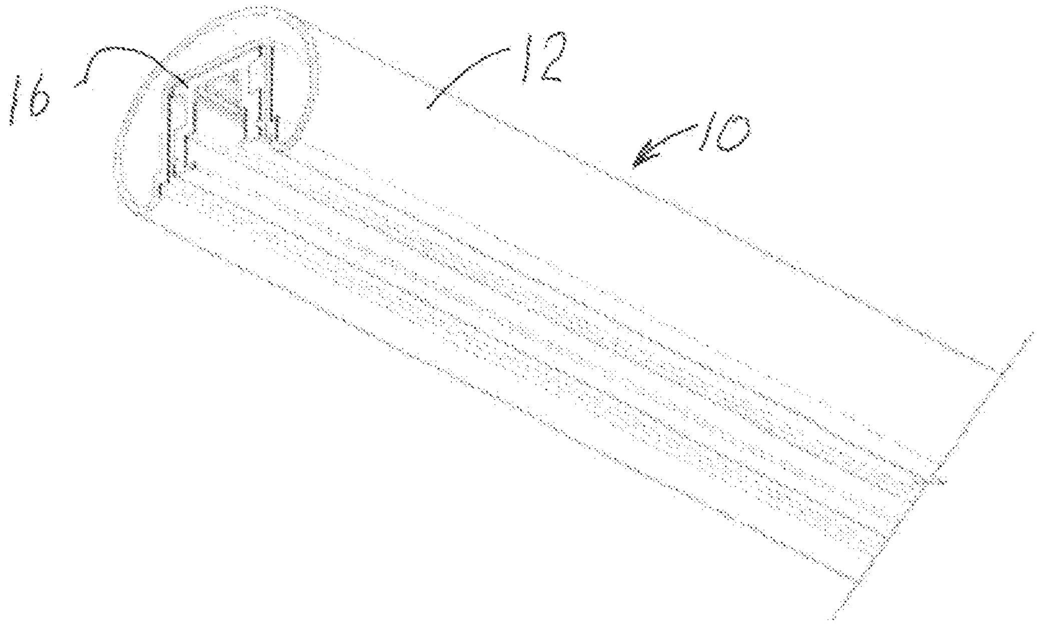
FIG. 8 is a perspective view of an assembled handrail segment without the LED array of the present invention.

As depicted in FIGS. 6, 7 and 8, the channel 16 has a top plate 30 having a profile to match the interior profile of the cavity 14 of the handrail body 12. The channel 16 further includes two oppositely disposed legs 32 and 34 extending down from the top plate 30 from a position about 0.1 inches to 0.4 inches inside the greatest width of the top plate 30. At the interior joining intersection of the legs 32 and 34 to the top plate 30, the channel may include slots 36 and 38 respectively, to receive aligning and connecting elements such as pins or screws to allow end-to-end affixing of two channels 16.

The legs 32 and 34 may also include shoulders 40 and 42 on the exterior surfaces 44 and 46 respectively of the legs 32 and 34. The shoulders 40 and 42 are configured to match the design of an internal flange 50 on the upper section 52 of the post connector 26, as depicted in FIG. 6, to prevent the handrail from being lifted off of the anchoring post 24. The legs 32 and 34 may also include indents 54 and 56 to receive connecting tabs associated with the lens cap 22 of FIGS. 2 and 3. The lens cap 22 is preferably installed between the anchoring posts 24. The lens cap 22 is preferably a light transparent material selected from the group consisting of glass, plastic or a polymer. The lens cap 22 is attached to the oppositely disposed legs 32 and 34 at a lower end of the channel 16.

The legs 32 and 34 also define an internal chamber 60, sized to receive the LED array 18. The bottom ends of the legs 32 and 34 may include feet or flanges 62, 64, extending radially inward forming interior ledges 66, 68 upon which the LED array 18 will rest once it is installed. In an alternative embodiment, the lens cap 22 may be inserted into the space defined between the flanges 62, 64. With this configuration, the channel 16, post connector 26 and lens cap 22 can be assembled and inserted into the cavity 14 of the handrail body 12 and the assembly can be secured to the respective anchor posts 24. After the assembly is complete, the LED array 18 is inserted and slides into the internal chamber 60, which is unobstructed and open through multiple end-to-end assembled channels 16 the entire length of the handrail 10. This configuration also allows the LED array 18 to be extracted from the internal chamber 60 for repairs or replacement.

The channel 16 is preferably formed from aluminum, stainless steel, or other lightweight metal, or a high strength engineered plastic. The channel 16 is preferably formed in an extrusion or roll press process. The channel 16 and handrail 12 may also be formed as a single extruded piece integrating the channel 16 into the handrail 12. The channel 16, or the integrated channel/handrail, may be formed in sections of any length up to twenty feet in length.

Figure 9:
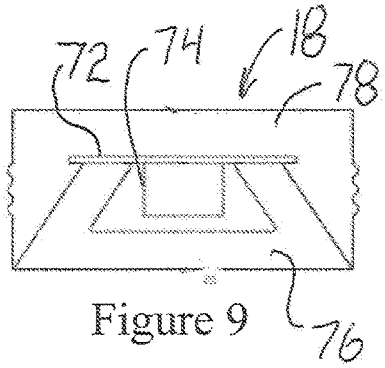
FIG. 9 depicts an enlarged cross section of the LED array 18 for the present invention.

FIG. 9 depicts an enlarged cross section of the LED array 18 for the present invention. The LED array 18 may include a flexible backing 70, a wiring strip 72 and a plurality of individual LEDs 74. The LED array 18 may further include a light transparent waterproof encapsulation material 76, and a solid color flexible plastic case 78. The lens cap 22 is formed from a rigid light transparent plastic or polymer material that may include concave or convex surfaces to disperse or focus the light from the LEDs 74.

It should be appreciated that the channel 16 and LED array 18 together define a lighting fixture that may be used to repair existing lighted handrails that have a cavity 14. A lighting fixture including the channel 16 and LED array 18 may be sold separately from the handrail and post components. In addition, the lighting fixture depicted and described herein may be used in applications other than handrails where the installation of the flexible LED array 18 from one end of a continuous channel 16 is beneficial, for example in long fixed or suspended lighting applications in enclosed areas from hallways to subways to roadway tunnels, or for peripheral lighting of buildings and other architectural features.

The invention has been described in detail above in connection with the figures, however it should be understood that the system may include other components and enable other functions. Those skilled in the art will appreciate that the foregoing disclosure is meant to be exemplary and specification and the figures are provided to explain the present invention, without intending to limit the potential modes of carrying out the present invention. The scope of the invention is defined only by the appended claims and equivalents thereto.

The invention claimed is:

1. A lighted handrail comprising:

a handrail body including a cavity;

at least one channel installed in said cavity of said handrail body, the at least one channel having a top plate and a pair of oppositely disposed legs extending from said top plate to define a chamber open the length of the channel and handrail body; and a light emitting diode array removably installed through a first end of the channel into the chamber and extending the length of the chamber, wherein the light emitting diode array further comprises: a light transparent waterproof encapsulation material and a solid color flexible plastic case.

2. The lighted handrail of claim 1, further comprising:

said light emitting diode array removably installed through a first end of the channel into the chamber and extending the length of the chamber, said light emitting diode array providing illumination along the entire length of said channel within said handrail.

3. The handrail of claim 1, wherein the legs of the channel define the chamber sized to receive the LED array and wherein the bottom ends of the legs include flanges extending radially inward forming interior ledges to support the LED array.

4. The handrail of claim 1, further comprising a lens cap attached to the oppositely disposed legs at a lower end of the channel wherein the lens cap includes a light transparent material selected from the group consisting of glass and plastic.

5. The handrail of claim 1, wherein the channel includes slots formed at the interior joining section of the top plate and the legs to receive aligning and connecting elements.

6. The handrail of claim 1, wherein said handrail body is formed from a material selected from the group consisting of wood, a lightweight strong metal such as aluminum or stainless steel, a plastic, or a composite material.

7. The handrail of claim 1, wherein said handrail body is at least partially translucent to allow the installed light emitting diode array to illuminate the handrail body.

8. The handrail of claim 1, wherein said handrail body includes spaced apart apertures illuminated by the installed light emitting diode array.

9. The handrail of claim 1, wherein said handrail body includes a cavity having a width in the range of 0.6 inches to 1.8 inches and the channel has a maximum width matching the width of the cavity.

10. The handrail of claim 1, wherein the light emitting diode array further comprises: a flexible backing, a wiring strip and a plurality of individual LEDs.

11. A method of assembling a lighted handrail comprising:

providing a handrail body including a cavity;

forming at least one channel using an extrusion process, the at least one channel having a top plate and a pair of oppositely disposed legs extending from said top plate to define a cavity open the length of the channel and handrail body;

installing said at least one channel in said cavity of said handrail body; and inserting a light emitting diode array through a first end of the channel into the cavity, the light emitting diode array extending the length of the at least one channel and the length of the handrail body to provide illumination extending the entire length of the handrail body; and providing at least two anchoring posts and at least two post connectors secured to the oppositely disposed vertical legs of the said channel by a sliding connector component enabling the linear light emitting diode array to pass over at least one of the at least two anchoring posts without interruption to provide continuous illumination for the entire length of the channel.

12. The method of assembling a lighted handrail of claim 11, further comprising:

forming a lens cap and affixing the lens cap onto said at least one channel.

13. The method of assembling a lighted handrail of claim 11, further comprising:

said at least two post connectors securable to the at least two anchoring posts upon which to mount the lighted handrail.

14. A lighting fixture comprising:

at least one channel formed from segments at least four feet in length, said channel having a top plate and a pair of oppositely disposed legs extending from said top plate to define a chamber open the length of the channel;

a light emitting diode array removably installed through a first end of the channel and extending the length of the channel wherein the light emitting diode array further comprises a flexible backing, a wiring strip and a plurality of individual LEDs to illuminate the entire length of the channel; and wherein said channel defined by the top plate and legs is sized to receive the LED array and wherein the bottom ends of the legs include flanges extending radially inward forming interior ledges to support the LED array; and at least two anchoring posts and at least two post connectors secured to the oppositely disposed vertical legs of the said channel by a sliding connector component enabling the linear light emitting diode array to pass over at least one of the at least two anchoring posts without interruption to provide continuous illumination for the entire length of the channel.

* * * * *